UNITED STATES PATENT OFFICE.

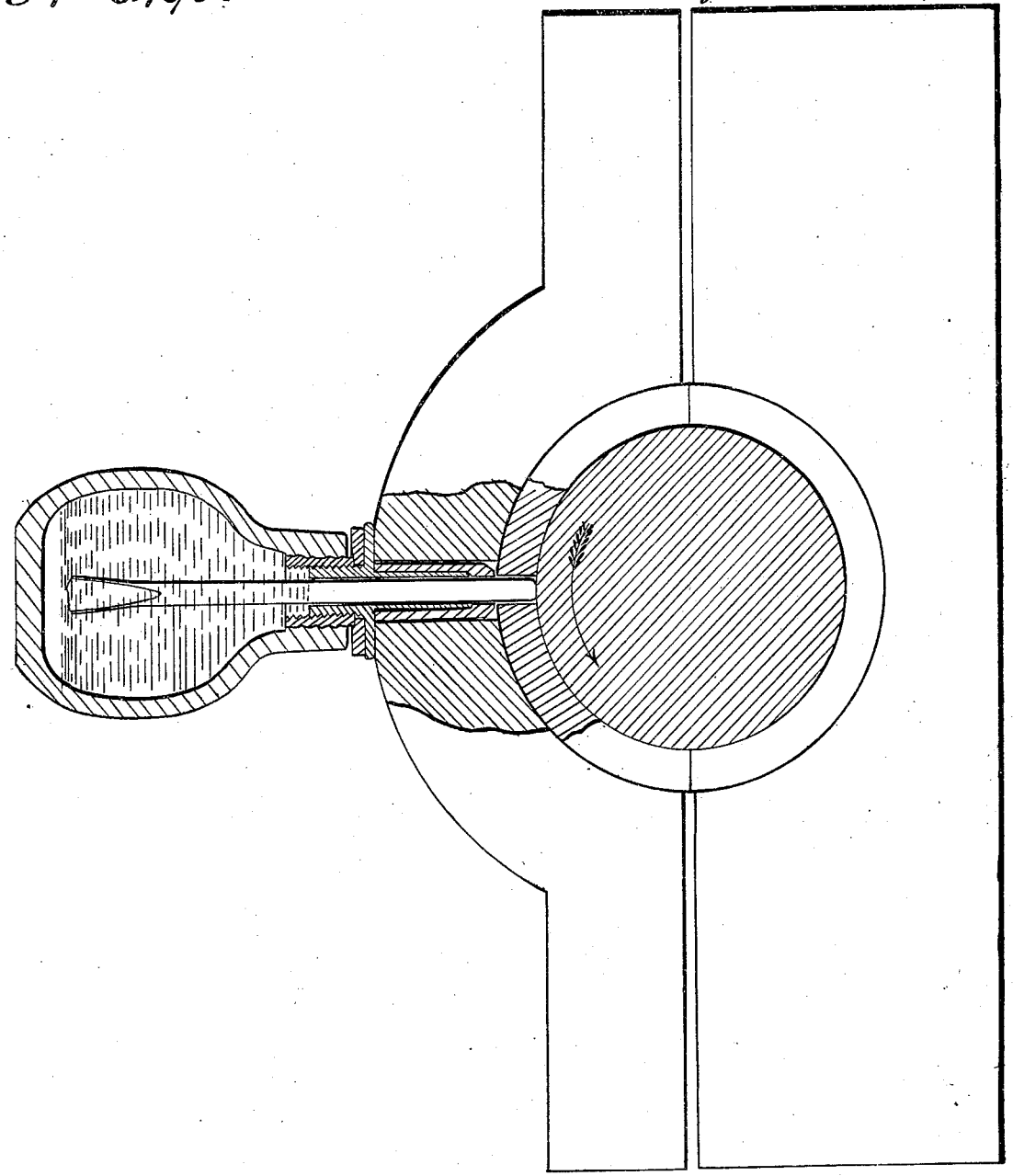

ISIDORE DREYFUS, OF NEW YORK, N. Y.

IMPROVEMENT IN AUTOMATIC LUBRICATORS.

Specification forming part of Letters Patent No. 64,956, dated May 21, 1867.

*To all whom it may concern:*

Be it known that I, ISIDORE DREYFUS, of the city, county, and State of New York, have invented a certain new and useful Improvement on Automatic Lubricators, of which the following is a full, clear, and exact description, reference being had to the accompanying drawing forming part of this specification, and which represents a vertical section of a lubricator constructed according to my improvement applied to a journal-box and revolving shaft contained or running therein.

My improvement in automatic lubricators relates to that description of such articles in which the device is a separate contrivance applied to journal-boxes or their glands, and from which the oil or lubricating material is drawn by the operation of the shaft. The nature of my invention in this relation consists in the application, to a journal-box or its gland, of a separate or detachable lubricator, made up of a close inverted cup or vessel, forming the lubricating-reservoir, and loose rod or dasher acting as a distributer, and set in motion by the shaft as it revolves, to warm or work down the oil, the supply of which ceases on the stoppage of the shaft.

Referring to the accompanying drawing, A represents the inverted close cup or reservoir, provided, say, with a screw-stopper, B, which, on removal, allows of its being supplied or replenished with the necessary lubricating material, and which has fitted onto it a wooden or other plug, C, that has passing through it and the stopper B, in a close but freely-turning manner, a loose rod or dasher, E, having a preferably roughened or irregularly-constructed lower end, that rests upon the shaft and fan or blade-shaped upper portion, which projects into or within the oil in the cup, and which, when the lubricator is inserted in its place by the fitting of the plug C through an orifice in the gland of the journal-box, is set in motion or revolved by the friction of the shaft in the rotation of the latter, causing, by such action of the rod or dasher, the oil to be warmed or worked around said rod in a thin or light stream onto the journal or bearing, but which, when the shaft ceases to revolve, stops and ceases to warm or work down the oil, and that, moreover, regulates the supply to the latter according to the velocity of the shaft.

This forms a cheap, simple, and efficient automatic lubricator, applicable to most or all revolving shafts.

The dasher, either plain or spiral, formation of the rod E within the inverted cup materially assists in counteracting the effect of a vacuum, or partial vacuum, above the oil in the cup, and facilitates its descent in the rotation of the shaft that gives motion to the dasher, and to which it serves to conduct the lubricating material. While, by this arrangement, all dust or dirt is excluded from the reservoir or cup, the agitation kept up therein by the rod or dasher serves to prevent thickening of the oil or secreting deposit restricting the flow or impairing the limpid character of the oil at the outlet.

The additional advantage of this lubricator is, that the abundance or sparseness of the supply of the lubricating material can be regulated by the size of the rod or dasher E—when smaller, allowing a freer flow of material, and, when larger, a smaller supply of same. Thus one lubricator, by being supplied with different sets of dashers or rods, provides various supplies of the lubricating material.

What I claim as my invention, and desire to secure by Letters Patent, is—

An automatic lubricator, constructed to be applied as described, provided with a loose rod or dasher set in motion by the journal, for conducting the lubricating material thereto, substantially as specified.

ISIDORE DREYFUS.

Witnesses:
SIMON STERN,
WILLIAM FURNESS.